United States Patent [19]
Borho et al.

[11] Patent Number: 6,005,302
[45] Date of Patent: Dec. 21, 1999

[54] FIXED-CYCLE POWER-SUPPLY CIRCUIT WITH AN AT LEAST TEMPORARILY ACTIVE CONSUMER-INDEPENDENT LOAD

[75] Inventors: Lothar Borho, Willstaett; Karl-Heinrich Preis, Beuhlertal; Klaus Eckert, Durbach Ebersweier; Robert Kern, Sasbachwalden; Gerhard Decker, Achern, all of Germany

[73] Assignee: Robert Bosch GmbH, Stuttgart, Germany

[21] Appl. No.: 09/043,978

[22] PCT Filed: Jun. 28, 1996

[86] PCT No.: PCT/DE96/01153

§ 371 Date: May 29, 1998

§ 102(e) Date: May 29, 1998

[87] PCT Pub. No.: WO97/12500

PCT Pub. Date: Apr. 3, 1997

[30] Foreign Application Priority Data

Sep. 28, 1995 [DE] Germany .............. 195 36 064

[51] Int. Cl.$^6$ .................................. H05B 37/02
[52] U.S. Cl. ............... 307/32; 307/30; 315/77; 315/DIG. 7; 323/299
[58] Field of Search ............ 307/10.8, 30, 31, 307/34, 35, 32; 315/77, 82, DIG. 7; 323/234, 267, 299

[56] References Cited

U.S. PATENT DOCUMENTS

| | | | |
|---|---|---|---|
| 4,748,398 | 5/1988 | Laue | 323/285 |
| 5,541,500 | 7/1996 | Krahl | 323/299 |
| 5,552,674 | 9/1996 | George et al. | 315/DIG. 7 |
| 5,625,258 | 4/1997 | Preis | 315/209 R |
| 5,631,546 | 5/1997 | Heinke | 323/267 |

*Primary Examiner*—Albert W. Paladini
*Attorney, Agent, or Firm*—Kenyon & Kenyon

[57] ABSTRACT

A clocked power supply circuit having an at least intermittently active load that is independent of a consumer, in particular for supplying power to gas-discharge lamps as consumers, contains a dc/dc converter comprising a transformer. Switching elements connect the converter to a dc voltage source in the timing of a control arrangement which makes available switching signals for the switching elements as a function of the prevailing output-side load state. The transformer of the dc/dc converter is designed so that two voltages (U+, U−) of differing polarity and magnitude, are able to be tapped off from the output side. At least one of these voltages is regulated and provided for supplying power during operation of the consumer. The at least intermittently active load can be switched to the regulated voltage.

13 Claims, 3 Drawing Sheets

FIXED-CYCLE POWER-SUPPLY CIRCUIT WITH AN AT LEAST TEMPORARILY ACTIVE CONSUMER-INDEPENDENT LOAD

FIELD OF THE INVENTION

The present invention relates to a clocked power supply circuit having an at least intermittently active load that is independent of a consumer, (e.g., a particular load) in particular for supplying power to gas discharge lamps as consumers.

BACKGROUND INFORMATION

In German Patent No. 42 31 968.4 A1, a clocked power supply circuit is described in which on the output side there is an at least intermittently active load that is independent of the electrical consumer, preferably a gas discharge lamp. The arrangement comprises contains a dc/dc converter, which is connected by way of switching elements to a dc power supply. The switching signals for the switching elements are made available by a control arrangement as a function of the load condition existing on the output side. In this known power supply circuit, only one voltage is available on the output side. If the consumer is a gas discharge lamp, then to ignite it, a much greater ignition voltage is needed in comparison to the operating voltage. In the known power supply circuitry, this voltage is applied by injection of an appropriate ignition pulse by means of a transformer to be specially provided. According to the known power supply circuit, after the ignition circuit reaches the specified voltage, it outputs an ignition pulse to the smoothing capacitor. This means that the output voltage has to be boosted to this elevated value. In this known power supply circuit, the load can be switched off and has a capacitor connected in outgoing circuit. Its stored energy is not sufficient to provide the energy required within a short time, to end the ignition process with certainty after said ignition process is introduced. Due to the load having the at least intermittently active converter load, a current is applied to it and the energy stored inductively in the secondary winding will be made available after the ignition to cover the elevated power requirement of the lamp. In accordance with the objective, the at least intermittently active converter load in this known array is active for the period following ignition, until its completion.

This is not the case in the circuit according to the present invention. Rather, here, it is not the ignition, but rather the time until ignition, which is quite significant to the operation of the intermittently active converter load.

SUMMARY OF THE INVENTION

The clocked power supply circuit of the present invention having an at least intermittently active load, that is independent of a consumer, in particular for the power supply of gas discharge lamps, as consumers, has the advantage compared thereto of the provision of two voltages, of which in each case one is regulated, wherein the voltage difference between these two voltages is sufficient for the provision of the ignition supply voltage and the thereby required speed of provision of the rated voltage is assured. This is possible in a low-cost implementation.

According to the present invention, this is achieved in principle, in that the transformer of the dc/dc converter is designed so that two voltages of differing polarity and magnitude can be tapped off from the output side, at least one of these voltages is regulated and provided for a power supply during operation of the consumer, and the at least intermittently active load can be switched to the regulated voltage.

In the preferred application of the power supply circuit designed according to the present invention for the energy supply to gas discharge lamps and their ignition device, the following discussion is essential. Based on the internal circuit design of the ignition device, a close tolerance supply voltage of, e.g., 460 V is needed to assure an orderly function. After the application of this supply voltage to the ignition device, the ignition voltage will build up within a short time. Due to the low loading which the ignition device represents up to the moment of ignition of the lamp, the situation is similar to an idle, and the converter has a very small load. A certain time will pass until the supply voltage reaches the rated value of, e.g., the aforementioned 460 V. Without the at least intermittently acting load in the converter used according to the present invention, this time can be unacceptably long, e.g., up to 20 msec. The actual ignition process will be extended by this time. Due to the loading of the converter with the at least intermittently acting load right from the beginning, it will be forced toward increased clock cycles and the supply voltage will build up faster. Due to this activity, this build-up time will be reduced significantly. In one design example, it can be reduced to a value of less than 5 msec.

According to one particularly favorable refinement of the present invention, the second voltage is likewise regulated, and to implement the regulation, a load can be applied at which the active value can be tapped off. This value is sent to a control circuit which switches the intermittently active load on or off as a function of the ascertained value of the second voltage. It is expedient to design the load as a voltage divider whose divider connection is run to the regulating circuit. Use of the at least intermittently acting load, switchable to the first controlled voltage, to control the other second voltage, represents one particularly favorable and cost-saving design.

According to an alternative configuration of this favorable refinement, through which the potential is created for a downward regulation of the second voltage, in that parallel to the voltage divider, a resistor is connected in series to a transistor that is switched on by the control circuit when the active value of the second voltage tapped off at the voltage divider is above the setpoint value. Thus, the advantage is that this voltage can be regulated in both directions.

In a favorable embodiment of this refinement of the present invention, the voltage divider is sized in such a manner that the pulse-to-pause ratio of the switching on or off of the intermittently active load remains not so small that it allows a regulation, in particular in both directions.

According to one favorable refinement of the present invention, the intermittently active load can be switched on or off using a variable resistor.

In a favorable embodiment of this refinement of the present invention, the intermittently active load is comprised of a series-connected ohmic resistor and a transistor, which can be switched on and off as a kind of two-point regulator, or which can be switched on for a more or less long time, with a pulse-width modulation signal corresponding to the pulse width.

Another alternative, advantageous embodiment of this refinement of the present invention consists in that the intermittently active load is comprised of a variable load resistor, in particular the drain source resistor of an FET transistor, the value of the resistor being a function of the magnitude of the gate-source voltage.

In yet another advantageous embodiment of the present invention, for the regulation of the controlled voltage or voltages, a microcontroller is provided which acts on the switching elements of the dc-dc-dc converter.

According to one particularly useful embodiment of the present invention, after complete switch on and operation of the consumer, one of the two voltages, preferably the unregulated one or the one with the greater absolute value, is switched off. This specific embodiment is important, in particular when used as the power supply for gas discharge lamps. There, the one voltage is needed as an auxiliary voltage for the ignition, in order to provide a sufficient voltage for the ignition device. The other voltage is usually regulated to a smaller absolute value and is used as the operating voltage.

In a favorable manner, the clocked power supply circuit according to the present invention is used in a control unit for supplying energy to high-pressure gas-discharge lamps, these being arranged, in particular, in headlights of motor vehicles.

DETAILED DESCRIPTION

The present invention is explained with reference to the exemplary embodiments illustrated in the associated Figures.

Figure 1:
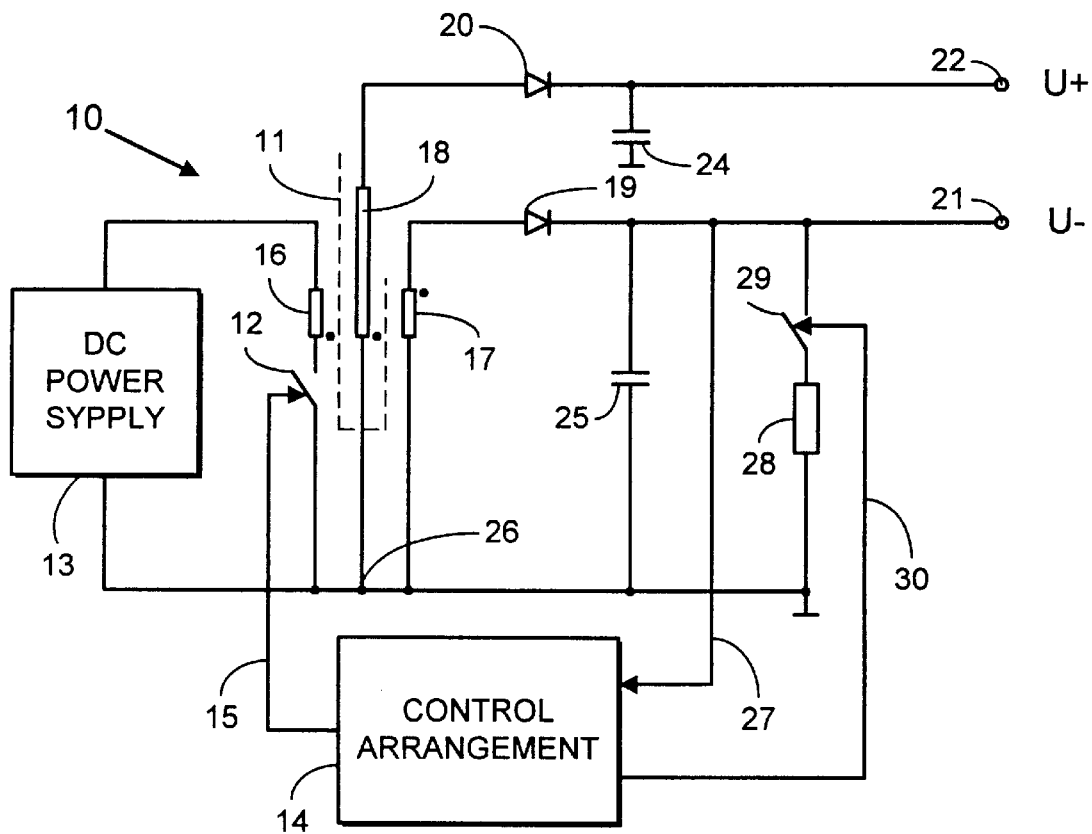
FIG. 1 is a schematic circuit diagram of a first exemplary embodiment of a circuit according to the present invention.

FIG. 1 shows a schematic circuit diagram of a first specific embodiment of a circuit according to the present invention. In this specific embodiment, one of the two voltages which supplies the clocked power supply circuit is not regulated. A dc/dc voltage converter 10 comprises a transformer 11. Converter 10 is linked by switching elements 12 to a dc power supply 13. A control arrangement 14 supplies switching signals 15 to switching elements 12 to operate converter 10 in a clocked cycle. The switching element 12, for example, a transistor, in particular an FET transistor, applies the voltage of dc power supply 13, for example, the battery of a motor vehicle, to a primary winding 16 of transformer 11.

Transformer 11 of converter 10 is equipped with two secondary windings 17 and 18 in such a manner that two voltages U– or U+, respectively, with differing magnitude and polarity, are applied each via one block diode 19 or 20 to output terminals 21 or 22. Thus the voltage U+ of greater absolute value, for example, according to the larger secondary winding 18, will build up at a smoothing capacitor 24 and be output from it to output terminal 22. Block diode 20 thus prevents capacitor 24 from discharging via associated secondary winding 18. In a corresponding manner, the smaller (in absolute value) voltage U– corresponding to smaller secondary winding 17 and having opposite polarity, will be built up at a smoothing capacitor 25 and output from it to output terminal 21. Block diode 19 is switched such that it prevents capacitor 25 from discharging via associated secondary winding 17. The particular beginning of the coil of windings 16, 17, 18 of transformer 11 is indicated by dotted lines. Therefore, it is clear that in this arrangement and the connection of the ground potential to connection point 26 of two opposing secondary windings 17 and 18 of transformer 11, the voltage to capacitor 24 is positive and the voltage to capacitor 25 is negative.

The voltage regulation of negative voltage U– is based on the fact that, on the primary side, the switching elements 12 are driven accordingly by control arrangement 14. For this regulation, the value of negative voltage U– is tapped off via a line 27 and sent to control arrangement 14. According to the load state at output 21, this control arrangement makes available switching signals 15 for operating converter 10 in clocked cycles by means of switching elements 12. Given minimal load to output terminal 21, converter 10 has increased clock cycles. If voltage U– drops below a predefined threshold value, then control arrangement 14 emits more switching signals 15, so that converter 10 is accordingly clocked more.

Provision is made between output terminal 21 of the regulated voltage U– and the ground potential connection 26 for an at least intermittently acting load. This load is comprised, according to the embodiment illustrated in FIG. 1, of the series circuit of an ohmic resistor 28 and a switch 29. The switch can be implemented preferably by a transistor which is supplied via a control line 30 with switching signals produced by control arrangement 14 for switching on the load by closing switch 29, or for switching off the load by opening of switch 29.

The at least intermittently acting load, in the switched-on state, causes converter 10 to be loaded with current or, additionally to the current load, to be loaded at output terminal 21. In turn, this allows the voltage U– to drop, so that once a lower threshold value is reached, converter 10 is increasingly clocked by control arrangement 14 to increase the voltage. Due to the increasing clocking of converter 10, smoothing capacitor 24 is also charged much faster and thus the second, positive voltage U+ (with its desired value) is available at output 22 much faster. This value is determined essentially by the translation ratio of primary winding 16 and of associated secondary winding 18, and also by the available voltage of dc voltage source 13.

According to one preferred application of the power supply circuit of the present invention, it is to be used for the operation of a gas-discharge lamp, in particular for a high-pressure gas discharge lamp. A lamp of this kind represents a difficult consumer. First, the lamp needs a high ignition voltage so that the arc will be produced. In this case, an igniter is provided which, in terms of load, represents virtually a no-load case for the supply circuit, and generates this high ignition voltage from the ignition supply voltage. The addition of the two voltages of U– and U+ is used for application of the large supply voltage for the igniters of, e.g., 460 V, in a very expeditious manner. In addition, the lamp requires a specific operating voltage. This can amount to as much as about 150 V. In this case, the regulated voltage U– can be provided with a rated value of –150 V, for instance. If the stated consumer, namely a gas-discharge lamp, as likewise preferred, is installed in the headlights of a motor vehicle, then it is self-evident that the light of this lamp must be available very quickly. Thus, it necessarily results that the needed ignition supply voltage must be provided very quickly after switching on the supply switch. Due to this load (comprised here of resistor 28 and closed switch 29), which is switched on at least intermittently at this time by control arrangement 14, converter 10 has loaded, in terms of current, right from the beginning, even when the consumer itself still requires little or only very little load. This means a fast clocking of converter 10 and, associated with this, a fast charging of both smoothing capacitor 24 for the second voltage U+ at output 22, and also for the first voltage U− forming the operating voltage at output 21. Thus, the needed ignition supply voltage formed from these two partial voltages will be available very quickly between output terminals 21 and 22.

After the ignition of the gas-discharge lamp as consumer, the second voltage U+ is no longer needed as a partial voltage which can also be designated the auxiliary voltage. Now the operation is maintained by means of the regulated, first voltage U−. Therefore, to prevent unnecessary loading, the intermittently acting load is shut off by opening switch 29, and resistor 28 no longer loads converter 10.

The fundamental design of the clocked power supply circuit designed according to the present invention and presented in FIG. 1 makes possible a low-cost implementation and only a few components are needed. No additional losses are incurred due to the shutdown of the intermittently acting converter load, namely when the consumer is in operation, i.e., the gas-discharge lamp is burning, for instance. The ignition supply voltage needed for the ignition will be very quickly available and only one voltage, the operating voltage U−, will have to be regulated.

When using the clocked power supply circuit of the present invention, the gas-discharge lamp, in particular in the form of a high-pressure gas-discharge lamp, is not connected directly to output terminals 21 and 22. Rather, usually there is an H bridge circuit 200 inserted in between, as presented in the design example according to FIG. 2. This H bridge circuit 200 contains preferably FET transistors as switches 201–204. These FET transistors are sensitive to overvoltages and, therefore, have to be protected from them. In the arrangement according to FIG. 1, it may possibly occur that between the switch on and the effective ignition of the lamp, the second voltage U+ will become large solely because the voltage difference applied between the output terminals exceeds the permissible overvoltage. This voltage difference is composed of the values of the two partial voltages U− and U+; thus an excessive amount can also come from the voltage U−. However, since the latter is regulated, care must be taken here to limit the second voltage U+, so that no over-voltage will occur at H bridge circuit 200.

Figure 2:
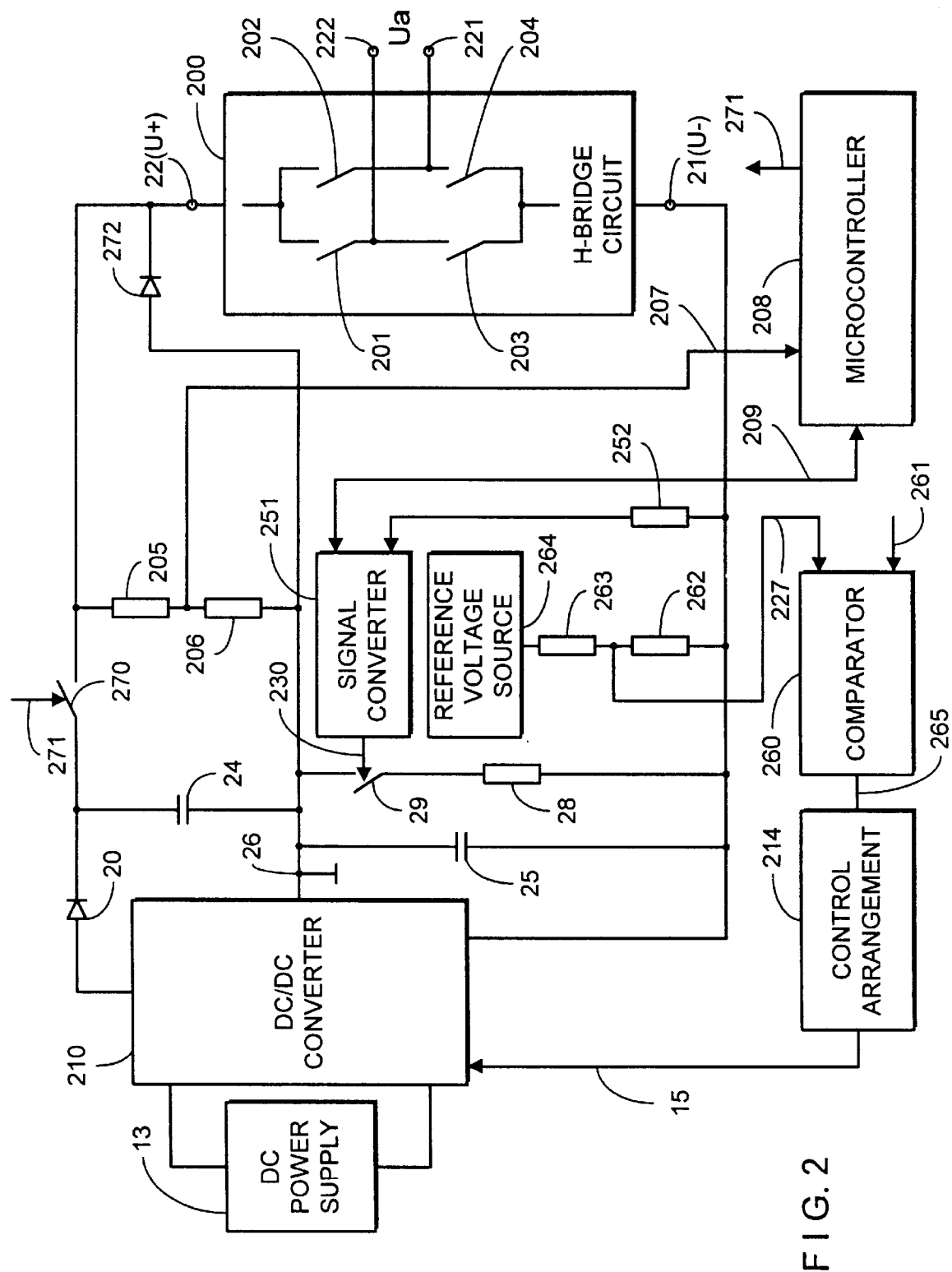
FIG. 2 is a schematic circuit diagram of a second exemplary embodiment of a circuit according to the present invention.

The additional design example of the present invention presented in FIG. 2 provides for the application of a load, in particular in the form of a voltage divider with resistors 205 and 206, to limit the voltage U+; this voltage divider is placed between output terminal 22 and ground potential 26 and loads associated output 22. The tapping off from the voltage divider takes place between two resistors 205 and 206 via a line 207, which leads as an input to a microcontroller 208 which is used as a regulating circuit. It generates an output signal, in particular a digital output signal, on line 209, which is fed to a signal converter 251. Said signal converter 251 generates from this, on line 230, a trigger signal for switch 29, which upon closing, connects resistor 28 (as load, in terms of current, of the intermittently effective load) to the dc/dc converter 210. When opening switch 29 via the corresponding signal on line 230, resistor 28 is disconnected from converter 210. Signal converter 251 is coupled via an auxiliary resistor 252 to voltage U−.

It should be pointed out here that in the embodiment according to FIG. 2, the same reference numbers are used for the equivalent components as in the embodiment of FIG. 1. Furthermore, the explanation is restricted in the embodiment according to FIG. 2 to the various measures, components, functions and modes of operation.

To regulate the voltage U−, according to the embodiment of FIG. 2, a comparator 260 is provided, to which as input on line 261 a comparison voltage is supplied as threshold value. On line 227, the active value of voltage U−, tapped off at the connecting point of a voltage divider, is fed to the comparator 260. The voltage divider is comprised of the two resistors 262 and 263, which is connected in series between the voltage U− and a reference voltage source 264. The reference voltage can be 5 V, for example. The result of the comparison of comparator 260 between comparison voltage 261 and the active value of U− on line 227 is sent via one output 265 to a control arrangement 214. It provides the clock signals on line 15 for converter 210.

Provision is made between smoothing capacitor 24 and output 22 for a switch 270, which is opened or closed by a signal on a line 271 from microcontroller 208. With this switch 270, the second voltage U+, regulated according to this embodiment, is then disconnected from output 22, when it is no longer needed there. In the preferred application, this is the case, for example, when the gas-discharge lamp has ignited and a large ignition supply voltage is no longer needed. Then ground potential 26 is applied to output terminal 22. Thus, for safety reasons, a reversing diode 272 is connected with its cathode to output terminal 22 and with its anode to ground potential 26. This arrangement is used because the negative voltage U− is applied to the other output terminal 21, which then outputs the operating voltage to the H bridge circuit and from there to the consumer, preferably a high-pressure gas-discharge lamp.

In the embodiment according to FIG. 2, the H bridge circuit 200 is shown as connected to output terminals 21 and 22. Between its two switches 201 and 203, this H bridge circuit has a consumer connection terminal 222 and between its two switches 202 and 204, a consumer connection terminal 221. Between these consumer connection terminals 221 and 222, the output voltage Ua is applied, and is supplied, e.g., to an ignition device (not illustrated) with the high voltage, i.e., the sum of the two partial voltages U− and U+, or to the (not illustrated) gas-discharge lamp with the operating voltage U−.

In summary, the mode of operation of the embodiment according to FIG. 2 is explained. In order that the voltage U+ does not get too large, it is loaded with the voltage divider formed from the resistors 205 and 206. If the voltage does not reach the required setpoint value due to the load, then the microcontroller 208 via the switch 29 switches the resistor 28 to the intermittently active converter load. Thus the voltage U− drops so that due to its regulation by means of the comparator 260, the clocking of the converter 210 becomes more intensive. Thus not only does the voltage U− rise back to its setpoint value, but rather due to the increased energy transmission to the secondary side of the converter 210, also the voltage U+ rises back to its setpoint value. If the setpoint value of U+ is exceeded, then the intermittently active converter load will be switched off by opening the switch 29. The converter 210 clocks less and the voltage U+ decreases.

The particular advantages of the specific embodiment according to FIG. 2 are seen in that the regulation of the second voltage U+ is very easy to implement, requires little additional effort or additional components. The at least intermittently acting load which is provided for quickly reaching the partial voltages, is also used for regulation of the second voltage U+.

Figure 3:
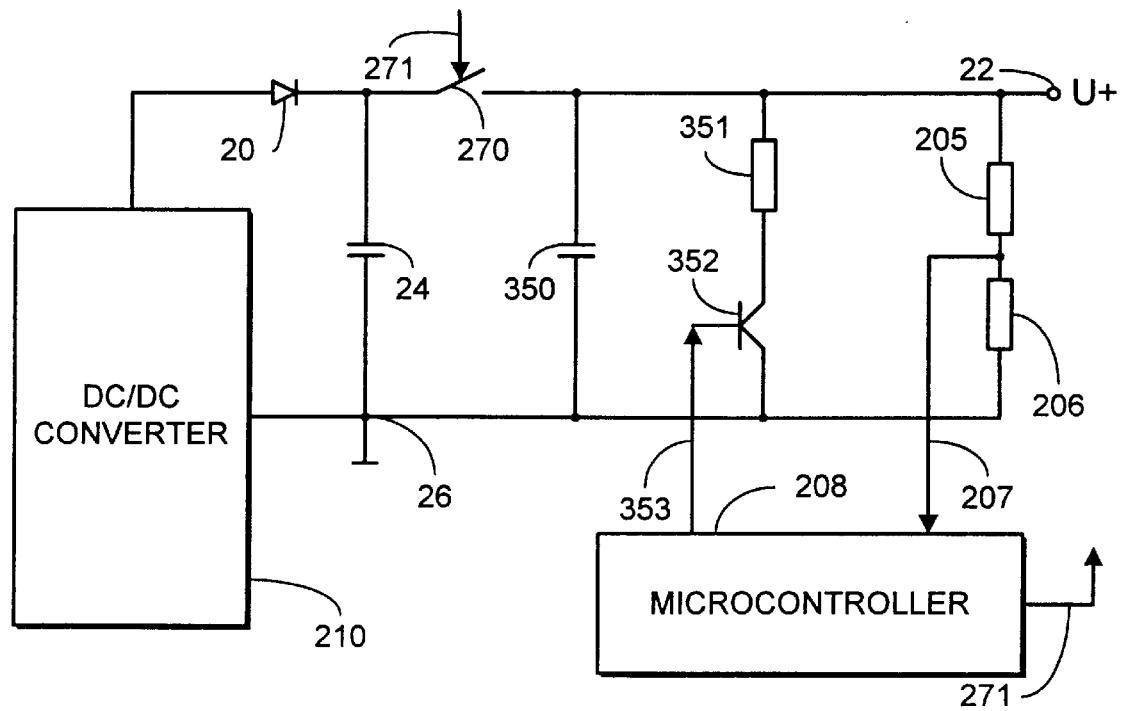
FIG. 3 is a schematic diagram of a refinement of the circuit of FIG. 2.

The regulation of the partial voltage U+ described above can be designated as the upward regulation, since to attain a setpoint value, the intermittently acting converter load 28 is used to increase the clocking and thus for the voltage increase of U+. In FIG. 3, in a modified circuit section of FIG. 2, one possible specific embodiment is represented for a downward regulation. The energy clocked from the converter 210 via the block diode 20 charges the smoothing capacitor 24. Said smoothing capacitor is connected in incoming circuit to switch 270. Arranged downstream from switch 270 is another capacitor 350, which upon closing of switch 270, by a signal on line 271 made available by microcontroller 208, takes over, as well, the charging and, thus, the voltage from capacitor 24, and acts as an additional buffer or smoothing capacitor. In the downward regulation, it is assumed that the voltage prior to and following the switching on of switch 270 is greater than the desired setpoint value, even after the regulation. The actual value of the voltage U+ is tapped off from line 207 at voltage divider 205, 206, as already described. Arranged parallel to this voltage divider, is the series connection of a resistor 351, which can be relatively low ohm, e.g., between about 10–100 kOhm, and a transistor 352. The base of transistor 352 is driven on a line 353 by microcontroller 208. If the transistor 352 is controlling, possibly in a suitable pulse-to-pause ratio, then U+ is loaded and regulated downward. In other words, due to this arrangement, the value of the tap-off point of voltage divider 205, 206 is reduced when the output voltage to capacitors 24 and 350 for the downward regulation is above the setpoint value.

Figure 4:
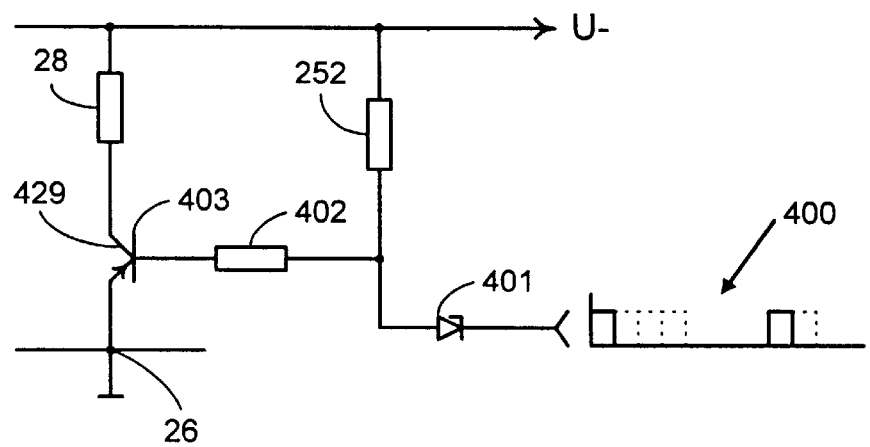
FIG. 4 is a schematic diagram of an exemplary embodiment of an at least intermittently switchable load according to the present invention.

FIG. 4 shows one embodiment of the at least partially effective load which can be connected to the dc/dc voltage converter 10 or 210. As intermittently active load, resistor 28 is switched on or off by a transistor 429 acting as switch 29 between ground potential 26 and voltage U−. For the control, a digital signal 400 is used which comes from microcontroller 208 and is shown as a type of pulse; this signal is sent via a Zener diode 401 and a resistor 402 to base 403 of transistor 429. A favorable pulse-to-pause ratio is at about ¼ "On" to ¾ "Off." This is shown in the illustration of the digital signal 400 by the combination of solid and dashed pulses. According to a numerical example, this ratio can be obtained when, as in the exemplary embodiment according to FIG. 2, the value for resistor 205 is about 500 kOhm, and the value for resistor 206 is about 7.5 kOhm.

In the implementation of the intermittently acting load, in addition to the means for achieving the objective above explained, various other means can be chosen. For example, it is possible to design transistor 429 as a kind of two-point regulator and to switch it through or to block it. Thus, resistor 28 is either switched entirely on or entirely off. In addition, it is possible to switch on the transistor for a more or less long period of time, with a pulse-width modulation signal corresponding to the selected pulse width. Accordingly, resistor 28 will act for a more or less long period of time on the clocking of converter 10 or 210. Another possible implementation consists of making available a variable load resistance as an at least intermittently acting load. This can be done with the aid of the drain-source resistor of an FET transistor. The value of this resistance will depend on the value of the gate source voltage.

The present invention makes it possible, by simple means, to make available two voltages for the power supply of a consumer with very different load states, which are applied very quickly after being switched on. This is of great importance, in particular in applications for the power supply to an ignition device for the fast provision of a sufficiently high ignition supply voltage, and also for a regulated operating voltage of a gas-discharge lamp, in particular for a high-pressure gas-discharge lamp.

What is claimed is:

1. A clocked power supply circuit, comprising:
    an at least intermittently active load being separate from a consumer;
    a dc/dc converter including a transformer;
    at least one switching element connecting the converter to a dc power supply; and
    a control arrangement providing switching signals to the at least one switching element as a function of a prevailing output-side load state,
    wherein first and second output voltages are tapped off at an output side of the transformer, the first and second output voltages having differing polarities and magnitudes, at least one of the first and second output voltages being regulated by the control arrangement and being provided as a power supply during an operation of the consumer, and
    wherein the control arrangement selectively switches the at least intermittently active load to the regulated at least one of the first and second output voltages.

2. The clocked power supply circuit according to claim 1, further comprising a microcontroller connected to the at least one switching element, the microcontroller regulating at least one of the first and second output voltages.

3. The clocked power supply circuit according to claim 1, further comprising:
    a further switching element selectively switching at least one of the first and second output voltages after a complete ignition of the consumer.

4. The clocked power supply circuit according to claim 1, wherein the consumer is a high-pressure discharge lamp.

5. The clocked power supply circuit according to claim 4, wherein the high-pressure discharge lamp is included in a headlight of a motor vehicle.

6. The clocked power supply circuit according to claim 1, further comprising:
    a regulating circuit, wherein a second output load is applied to the second output voltage, wherein the control arrangement determines an active value of the second output voltage at the second output load and transmits the active value of the second output voltage to the regulating circuit, and wherein the regulating circuit switches the at least intermittently active load on and off as a function of the active value to regulate the second output voltage.

7. The clocked power supply circuit according to claim 6, wherein the second output load includes a voltage divider having a divider connection, the divider connection being connected to the regulating circuit.

8. The clocked power supply circuit according to claim 7, further comprising a first series connection arranged parallel to the voltage divider, the first series connection including a first resistor and a first transistor connected to one another in series.

9. The clocked power supply circuit according to claim 7, wherein the voltage divider maintains a pulse-to-pause ratio of the switching of the at least intermittently active load above a minimum ratio.

10. The clocked power supply circuit according to claim 1, wherein the at least intermittently active load has a variable resistance, and wherein the control arrangement selectively switches the at least intermittently active load on and off by adjusting the variable resistance.

11. The clocked power supply circuit according to claim 10, wherein the at least intermittently active load includes an ohmic resistor and a second transistor connected in series, and wherein the second transistor is selectively maintained in one of a two-point regulating state and a modulating state;

wherein in the two-point regulating state the second transistor is switched on and off; and wherein in the modulating state the second transistor is switched on for a long period of time, with a pulse-width modulation signal corresponding to a selected pulse width.

12. The clocked power supply circuit according to claim 10, wherein the at least intermittently active load includes a variable load resistor.

13. The clocked power supply circuit according to claim 12, wherein the variable load resistor is a drain-source resistor of a FET transistor, a value of the drain-source resistor being a function of a magnitude of a gate-source voltage of the FET transistor.

* * * * *